United States Patent
Kim et al.

(10) Patent No.: US 10,237,010 B2
(45) Date of Patent: Mar. 19, 2019

(54) METHOD AND APPARATUS OF CONSTRUCTING INTERFERENCE COMPONENT AND ESTIMATING CHANNEL FOR MULTICARRIER SYSTEMS WITH NON-ORTHOGONAL WAVEFORM

(71) Applicant: Samsung Electronics Co., Ltd, Gyeonggi-do (KR)

(72) Inventors: Kyeongyeon Kim, Gyeonggi-do (KR); Yongho Cho, Gyeonggi-do (KR); Chanhong Kim, Gyeonggi-do (KR); Yeohun Yun, Gyeonggi-do (KR); Jiyun Seol, Gyeonggi-do (KR); Ka Ming Ho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 15/229,032

(22) Filed: Aug. 4, 2016

(65) Prior Publication Data
US 2017/0041097 A1     Feb. 9, 2017

(30) Foreign Application Priority Data

Aug. 4, 2015     (KR) .......................... 10-2015-0110017

(51) Int. Cl.
| | |
|---|---|
| *H04J 11/00* | (2006.01) |
| *H04B 7/0456* | (2017.01) |
| *H04L 5/00* | (2006.01) |
| *H04L 25/02* | (2006.01) |

(52) U.S. Cl.
CPC ........ *H04J 11/0023* (2013.01); *H04B 7/0456* (2013.01); *H04L 5/0048* (2013.01); *H04L 25/023* (2013.01)

(58) Field of Classification Search
None
See application file for complete search history.

(56) References Cited

U.S. PATENT DOCUMENTS

| | | | |
|---|---|---|---|
| 2014/0226600 A1* | 8/2014 | Tang | H04B 1/7107 370/329 |
| 2015/0003359 A1* | 1/2015 | Hoshino | H04W 24/08 370/329 |
| 2015/0049836 A1 | 2/2015 | Li et al. | |
| 2017/0111155 A1* | 4/2017 | Liu | H04L 5/0055 |

FOREIGN PATENT DOCUMENTS

CN         103888406       6/2015

* cited by examiner

*Primary Examiner* — Chi H Pham
*Assistant Examiner* — Raul Rivas

(57) ABSTRACT

A system and method for constructing an interference component using a detected data symbol and an estimated channel response in a non-orthogonal system and a method of estimating a channel using a structure of the non-orthogonal system and the interference component are provided. The system includes a receiver that receives a reference signal and data transmitted from a transmitter; detects adjacent data symbols around the reference signal; estimates an initial channel state; constructs the interference signal based on the adjacent data symbols and the initial channel state; estimates the channel state on the basis of the constructed interference signal; and perform an iterative process of reconstructing the interference signal based on the basis of the estimated channel state and re-estimates the channel state based on the reconstructed interference signal.

20 Claims, 11 Drawing Sheets

FIG. 10
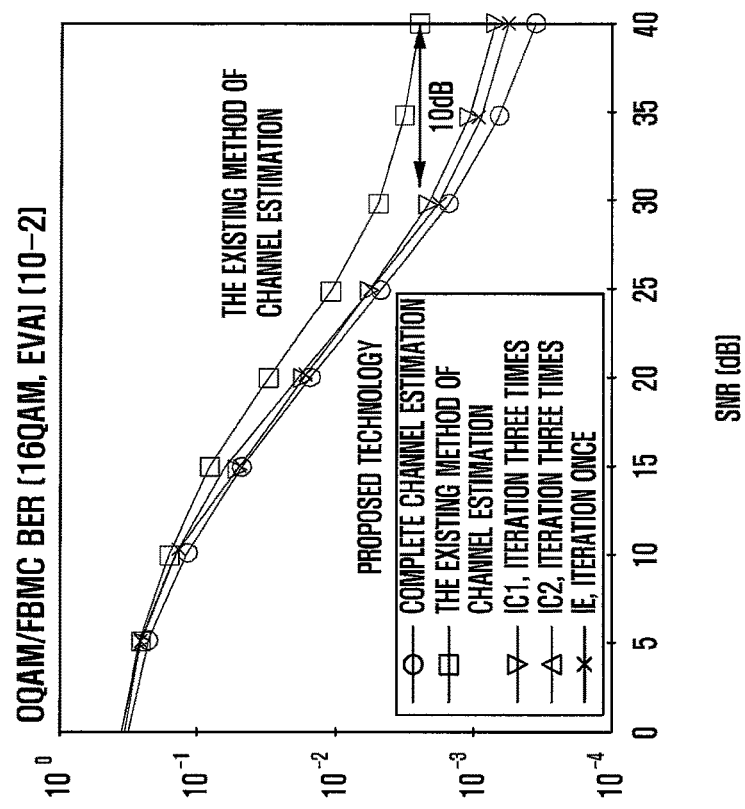
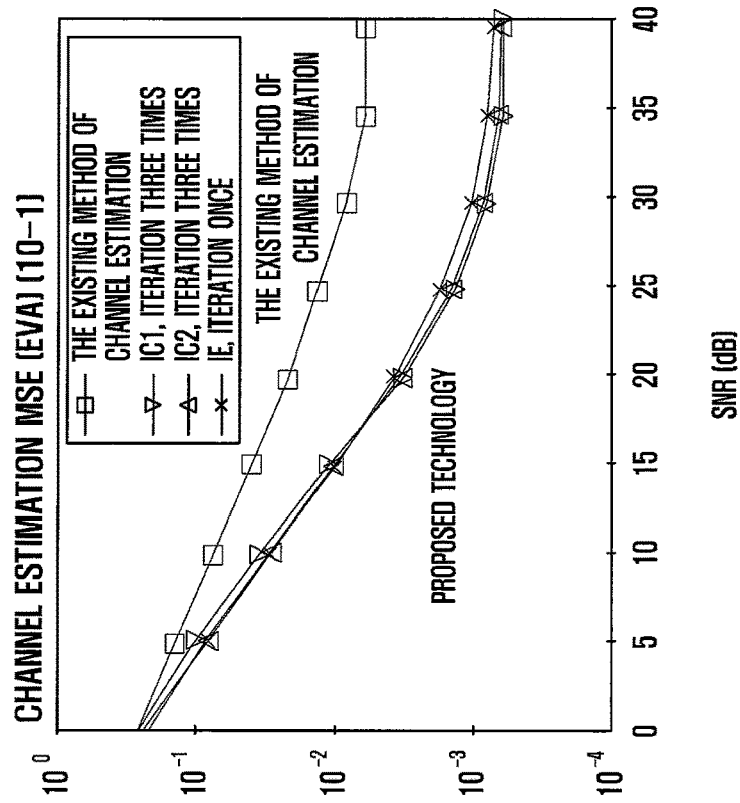

METHOD AND APPARATUS OF CONSTRUCTING INTERFERENCE COMPONENT AND ESTIMATING CHANNEL FOR MULTICARRIER SYSTEMS WITH NON-ORTHOGONAL WAVEFORM

CROSS-REFERENCE TO RELATED APPLICATION(S) AND CLAIM OF PRIORITY

The present application is related to and claims the benefit under 35 U.S.C. § 119(a) of a Korean patent application filed on Aug. 4, 2015, in the Korean Intellectual Property Office and assigned Ser. No. 10-2015-0110017, the entire disclosure of which is hereby incorporated by reference.

TECHNICAL FIELD

Various embodiments of the present disclosure relate to a method of constructing an interference component in multi-carrier systems with a non-orthogonal waveform and a method and an apparatus of estimating a channel using the same.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Research into a multi-carrier system using a non-orthogonal waveform to increase frequency confinement while transmitting data at a high speed has been actively conducted in recent years. As the representative multi-carrier system using the non-orthogonal waveform, there is a filter bank multi-carrier (hereinafter, FBMC) system using offset-QAM. Further, the FBMC system supporting general QAM instead of the offset-QAM has also been proposed. Further, generalized frequency division multiplexing (GFDM) that has been actively researched in recent years also belongs to a multi-carrier system using a non-orthogonal wave.

In the orthogonal frequency division multiplexing (OFDM) system, data are allocated to each subcarrier and are converted into a time domain signal by an inverse FFT (IFFT) calculation and transmitted. In this case, each data may be considered to be modulated by a rectangular filter and may keep orthogonality between the respective subcarriers due to the rectangular filter. However, when the rectangular filter is applied, emission power of a considerable magnitude (−13 dB) is generated, and therefore in the case of the OFDM, a considerable guard band is required, such that maximum frequency efficiency is not obtained. Alternatively, the multi-carrier system using the non-orthogonal waveform uses a filter having a time impulse response having a length longer than that of the rectangular filter in OFDM to generate much smaller emission power, and as a result, requires a smaller guard band, thereby increasing frequency use efficiency.

In the multi-carrier system using the non-orthogonal waveform, a data symbol also has a symbol having a length longer than that of the OFDM due to the long impulse response filter. The non-orthogonal system adopts an overlap & sum structure to prevent the frequency efficiency from being reduced due to an extended symbol length.

SUMMARY

To address the above-discussed deficiencies, it is a primary object to provide a method of constructing an interference component using a detected data symbol and an estimated channel response in a non-orthogonal system and a method of estimating a channel using a structure of the non-orthogonal system and the interference component, and an apparatus for performing the method.

Various embodiments of the present disclosure are directed to the provision of a method for estimating a channel by constructing, by a receiver, an interference signal comprising: receiving a reference signal and data transmitted from a transmitter; detecting adjacent data symbols around the reference signal; estimating an initial channel state; constructing the interference signal on the basis of the adjacent data symbols and the initial channel state; estimating the channel state on the basis of the constructed interference signal; and performing an iterative process of reconstructing the interference signal on the basis of the estimated channel state and re-estimating the channel state on the basis of the reconstructed interference signal.

Various embodiments of the present disclosure are directed to the provision of a receiver for channel estimation by constructing an interference signal comprising: a transceiver configured to receive a reference signal and data transmitted from a transmitter; and a controller configured to perform a control to perform an iterative process of detecting adjacent data symbols around the reference signal, estimating an initial channel state; constructing the interference signal on the basis of the adjacent data symbols and the initial channel state, estimating the channel state on the basis of the constructed interference signal, reconstructing the interference signal on the basis of the estimated channel state and re-estimating the channel state on the basis of the reconstructed interference signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 is a diagram illustrating the effect of the present disclosure; and

DETAILED DESCRIPTION

Figure 1:
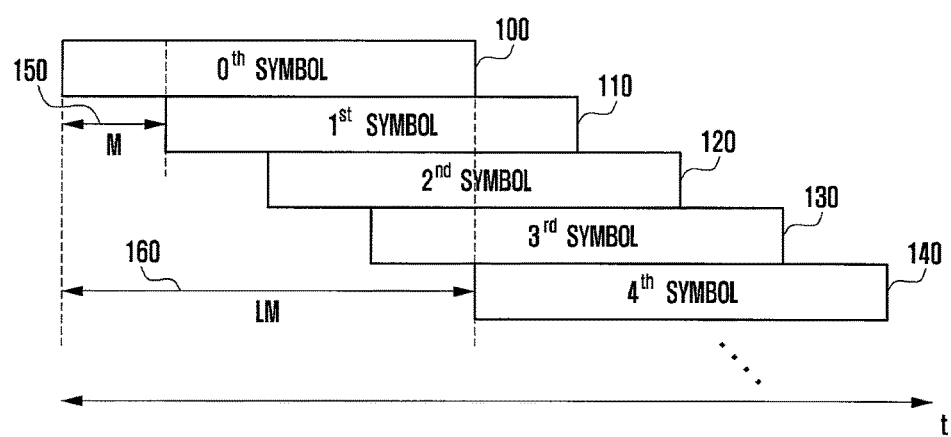
FIG. 1 is a diagram illustrating an example in which a transmit signal is constructed by the overlap & sum structure adopted in the non-orthogonal system.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention of users and operators. Therefore, the definitions thereof should be construed based on the contents throughout the specification.

Further, embodiments of the present disclosure mainly describe an FBMC based wireless communication system but a major subject of the present disclosure can be applied to a general non-orthogonal system adopting an overlap & sum transmitting and receiving structure. Representative system to which embodiments of the present disclosure can be applied include QAM/FBMC, OQAM/FBMC, GFDM, biorthogonal frequency division multiplexing (BFDM), and filterbank multitone (FMT) systems.

Other communication systems having a similar technical background and a channel form can also be applied with a slight modification without greatly departing from the scope of the disclosure, which can be made by a determination by a person having ordinary skill in the art to which the present disclosure pertains.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

FIG. 1 is a diagram illustrating an example in which a transmit signal is constructed by the overlap & sum structure adopted in the non-orthogonal system. Referring to FIG. 1, M represents a Nyquist transmission rate, L represents a natural number of 2 or more which is called an overlapping factor. In the case of FIG. 1, L represents 4 but can be changed depending on a filter design. In the non-orthogonal system, the multi-carrier symbol is delayed as much as time corresponding to an M sample and then transmitted. Alternatively, the respective symbol lengths are LM, and therefore adjacent symbols overlap with each other during the process of constructing a transmit signal. A $2^{nd}$ symbol 120 overlaps with a $0^{th}$ symbol 100 and a $1^{st}$ symbol 110 from the front and overlap with a $3^{rd}$ symbol 130 and a $4^{th}$ symbol 140 from the back. In this case, inter-symbol interference (ISI) between the overlapping symbols occurs due to the non-orthogonal characteristics of the filter.

In addition, inter-carrier interference (ICI) that is another inter-subcarrier interference within a symbol also occurs due to the non-orthogonal characteristics of the filter in the non-orthogonal system. Unlike the OFDM system, the interference occurs due to the non-orthogonal characteristics of the filter in the non-orthogonal system. In other words, in the case of the OFDM system, a signal-to-interference ratio (SIR) is infinite, while in the case of the non-orthogonal system, the SIR has a finite SIR value. The two interferences have a great effect on the receiving process of the non-orthogonal system, and therefore to obtain the same receiving performance as the OFDM system, an operation of a receiver considering the effect due to the two interferences is essentially required.

In the wireless communication system, the transmit signal is distorted by a radio channel between a transmitter and a receiver to reach the receiver. In this case, finding the distortion occurring due to the radio channel is called channel estimation. The receiver compensates for the distortion well to detect the transmit signal. Therefore, as the accuracy of the channel estimation is high, the distortion can be compensated well. Therefore, the channel estimation has a great effect on the detection performance of the system.

The channel estimation in the non-orthogonal system is far more difficult than the channel estimation in the OFDM due to the interference occurring by the foregoing filter. For this reason, the channel estimation in the non-orthogonal system has been actively researched in recent years.

Prior to describing an operation of the present disclosure, the present disclosure can be applied to a reference signal (RS) having various structures such as a preamble, a cell-specific RS (CRS), a demodulation RS (DMRS), or the like, without limiting a structure of the reference signal (used together with pilot). Further, the present disclosure can be applied to two cases of a downlink (DL) and an uplink (UL). Therefore, instead of the terminal and the base station, representations called a transmitter and a receiver are used and in some cases, the transmitter or the receiver can also be called the terminal or the base station.

The interference component affecting the reference signal in the non-orthogonal system largely includes a value determined by a transmit signal and a channel impulse response. A transmit signal model in a general non-orthogonal system including the QAM/FBMC can be represented by the following Equation 1.

[Equation 1]

$$x[n] = \sum_{k=-\infty}^{\infty} \sum_{m=0}^{M-1} X_m[k] p_m[n-kM] e^{j\frac{2\pi}{M}mn} \quad (1)$$

In the above Equation 1, $x[n]$ represents a baseband transmit signal in a time domain of a non-orthogonal multi-carrier system such as the QAM/FBMC, M represents the number of subcarriers of the system (equal to the IFFT magnitude in the OFDM), $X_m[k]$ represents a QAM symbol carried on an $m^{th}$ subcarrier in a $k^{th}$ QAM/FBMC symbol, and $p_m[n]$ represents a pulse shaping filter coefficient that will be applied to the $m^{th}$ subcarrier. A length of the pm[n] is determined in proportion to an overlapping factor L and the length can be generally LM.

A receive signal model considering a multi-path fading channel in the wireless communication can be represented by the following Equation 2.

[Equation 2]

$$y[n]=h[n]*x[n]+w[n] \quad (2)$$

In the above Equation 2, $y[n]$ represents a baseband receive signal in the time domain, $h[n]$ represents the multi-path fading channel, and $w[n]$ represents additive white Gaussian noise (AWGN). Symbol '*' represents convolution.

For convenience, when only RS allocated to the symbol is considered, a frequency domain receive signal of the QAM/FBMC symbol including the RS can be represented by the following Equation 3.

[Equation 3]

$$\underline{Y}_{RS}[0] = P_R^H H_f[0] P_T \underline{X}[0] + \sum_{k=-L, k\neq 0}^{L-1} P_R^H H_f[k] P_T \underline{X}[k] + P_R^H \underline{W}[0] \quad (3)$$

In the above Equation 3, $\underline{Y}_{RS}[0]$ represents a frequency domain vector (magnitude [M×1]) of a $0^{th}$ QAM/FBMC receiving symbol and will be described the $0^{th}$ symbol for convenience without losing generality. $P_T$ represents a filter coefficient matrix (magnitude [N×M], N=LM) enumerating the time domain filter coefficients $p_m[n]$ of all the subcarriers, which are applied at a transmitting end, based on a column and $P_R$ represents a filter coefficient matrix defined by the same scheme as the $P_T$ applied at a receiving end. $(\cdot)^H$ represents a Hermitian (conjugate transpose) operation. $H_f[k]$ represents the frequency domain channel matrix of the QAM/FBMC symbol, which has resolution L times as high as the number of subcarriers M (magnitude [N×M]). $\underline{X}[k]$ represents a $k^{th}$ QAM/FBMC transmit symbol vector (magnitude [M×1]). (i.e., $\underline{X}[k]=[X_0[k], X_1[k], \ldots, X_{M-1}[k]]^T$ and $(\cdot)^T$ represents the transpose operation). Further, for convenience of explanation, it is assumed that the RS is included in the $\underline{X}[0]$. $\underline{W}[0]$ represents a frequency domain AWGN vector obtained by multiplying a column vector w[0] (magnitude [N×1]) using AWGN w[n] (0≤n<N) of the time domain in which the 0th QAM/FBMC symbol is present by an N-point discrete Fourier transform (DFT) matrix $W_N$.

$$\left(\text{i.e., } w[0] = [w[0], w[1], \ldots, w[N-1]]^T, \right.$$
$$\left. W_N \triangleq \frac{1}{\sqrt{N}} \left[ e^{-j\frac{2\pi}{N}(i-1)(j-1)} \right]_{1 \leq i, j \leq N}, \underline{W}[0] = W_N w[0] \right).$$

Describing in more detail, Hf[k] is represented by the following Equation 4.

[Equation 4]

$$H_f[k]=W_N^H T[k] H W_N \quad (4).$$

In the above Equation 4, $W_N$ represents the N-point DFT matrix already defined and T[k] represents a truncation matrix of magnitude [N×(N+M)] defined by the following Equation 5.

[Equation 5]

$$T[k] \triangleq \begin{cases} \begin{bmatrix} 0 & I_{N+M+kM} \\ 0 & 0 \end{bmatrix}, & k < 0 \\ [I_N \ 0], & k = 0 \\ \begin{bmatrix} 0 & 0 \\ I_{N-kM} & 0 \end{bmatrix}, & k > 0 \end{cases} \quad (5)$$

In the above Equation 5, $I_N$ represents an identity matrix that is magnitude [N×N] and 0 represents a matrix in which all elements are 0. The magnitude 0 is changed to meet a condition and thus becomes magnitude [N×(N+M)] of the T[k]. For example, the magnitude of 0 when k=0 is [N×M]. A matrix H is the Toeplitz matrix of an impulse response vector $\underline{h}$ ($\underline{h} \triangleq [h[0], h[1], \ldots, h[L_c-1]]^T$) of a multi-path channel h[n] having length Lc, which is a method for representing convolution performance with the transmit signal by a matrix and is represented by the following Equation 6.

[Equation 6]

$$H(:, n) = \text{circshift}(h, n-1) \quad (6)$$

In the above Equation 1-3, $H(:, n)$ represents an $n^{th}$ column of the matrix H and represents a function of circularly shifting downwardly elements of a circshift (a, n) column vector as much as n and h represents the column vector having the magnitude [M×1] defined by the following Equation 7.

[Equation 7]

$$h = \begin{bmatrix} \underline{h} \\ \underline{0}_{N+M-L_c} \end{bmatrix} \quad (7)$$

In the above Equation 7, $\underline{0}_{N+M-L_c}$ represents a column vector having (N+M-$L_c$) 0 as an element.

The above Equation 3 can be changed to the form like the following Equation 8.

[Equation 8]

$$\underline{Y}_{RS} = \left( P_R^H W_N T[0] Q_x[0] + \sum_{k=-L, k \neq 0}^{L-1} P_R^H W_N T[k] Q_x[k] \right) h + P_R^H \underline{W}[0] \quad (8)$$

$$= \Phi[0] h + \sum_{k=-L, k \neq 0}^{L-1} \Phi[k] h + P_R^H \underline{W}[0]$$

In this case, $Q_x[k]$: $W_N^H P_T X[k]$ and $\Phi[k] = P_R^H W_N T[k] Q_x[k]$. $\underline{X}[k]$ represents a square matrix (magnitude [M×M]) obtained by diagonalizing the $\underline{X}[k]$ (column vector) of the Equation 3. In the above Equation 8, $$\sum_{k=-L, k \neq 0}^{L-1} \Phi[k] h$$

represents the interference component. Therefore, for the receiver to construct the interference component, the detected transmit signal around the reference signal and an estimated value of the channel impulse response are required.

Figure 2:
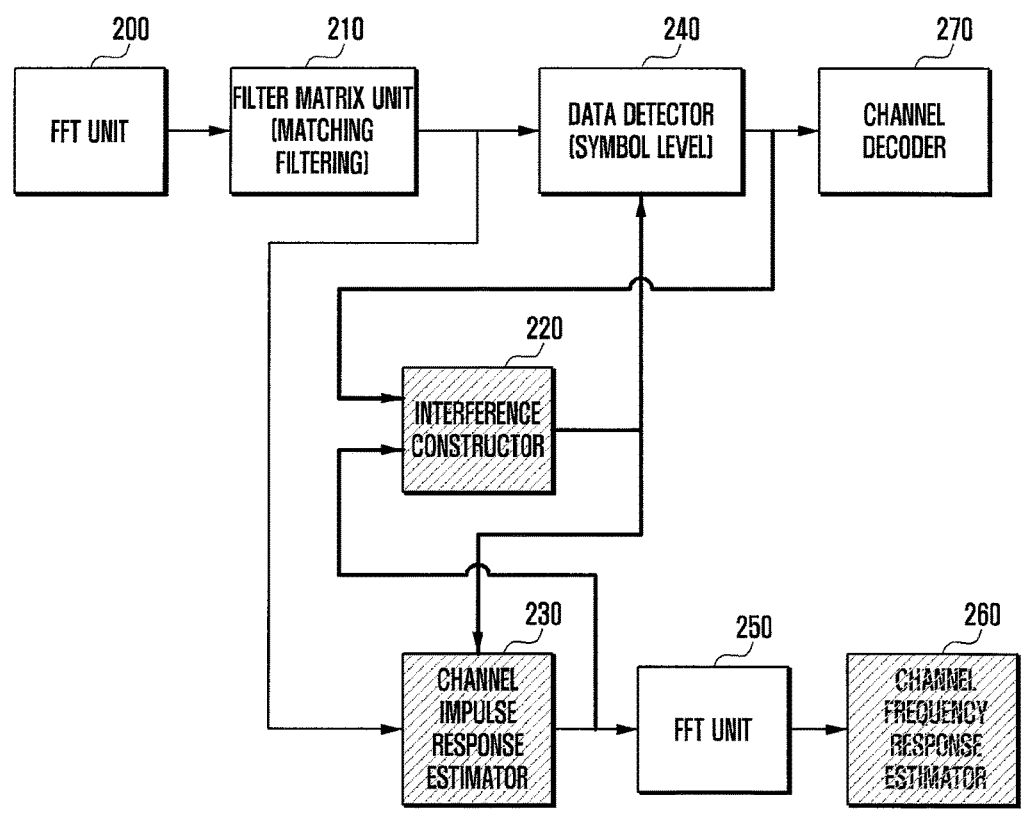
FIG. 2 is a diagram illustrating a structure of a receiver according to an embodiment of the present disclosure.

FIG. 2 is a diagram illustrating a structure of a receiver according to an embodiment of the present disclosure. Referring to FIG. 2, the receiver proposed in the present disclosure is configured to include an FFT unit 200, a filter matrix unit 210 performing matching filtering, an interference constructor 220, a channel impulse response estimator 230, a data detector 240 detecting data using a symbol level, an FFT unit 250, a channel frequency response estimator 260, and a channel decoder 270 performing FFT unit channel decoding.

In particular, the interference constructor 220 newly proposed in the present disclosure is largely configured to include a portion determining a window that is a range of the transmit signal required on time and frequency around the reference signal to construct the interference component and detecting the transmit signal based on the determined window, a portion processing the detected transmit signal, and a portion constructing the interference component using the value determined by the transmit signal finally detected and the estimated value of the channel impulse response estimated by the channel impulse response estimator 230. The channel impulse response estimator 230 calculates the channel impulse response using the interference component constructed by the interference constructor and a channel estimator calculated.

The present disclosure proposes a method of constructing an interference component based on two schemes. The first method is a method of constructing an interference component based on a time domain transmit signal and the second method is a method of constructing an interference component based on a frequency domain transmit signal.

Figure 3:
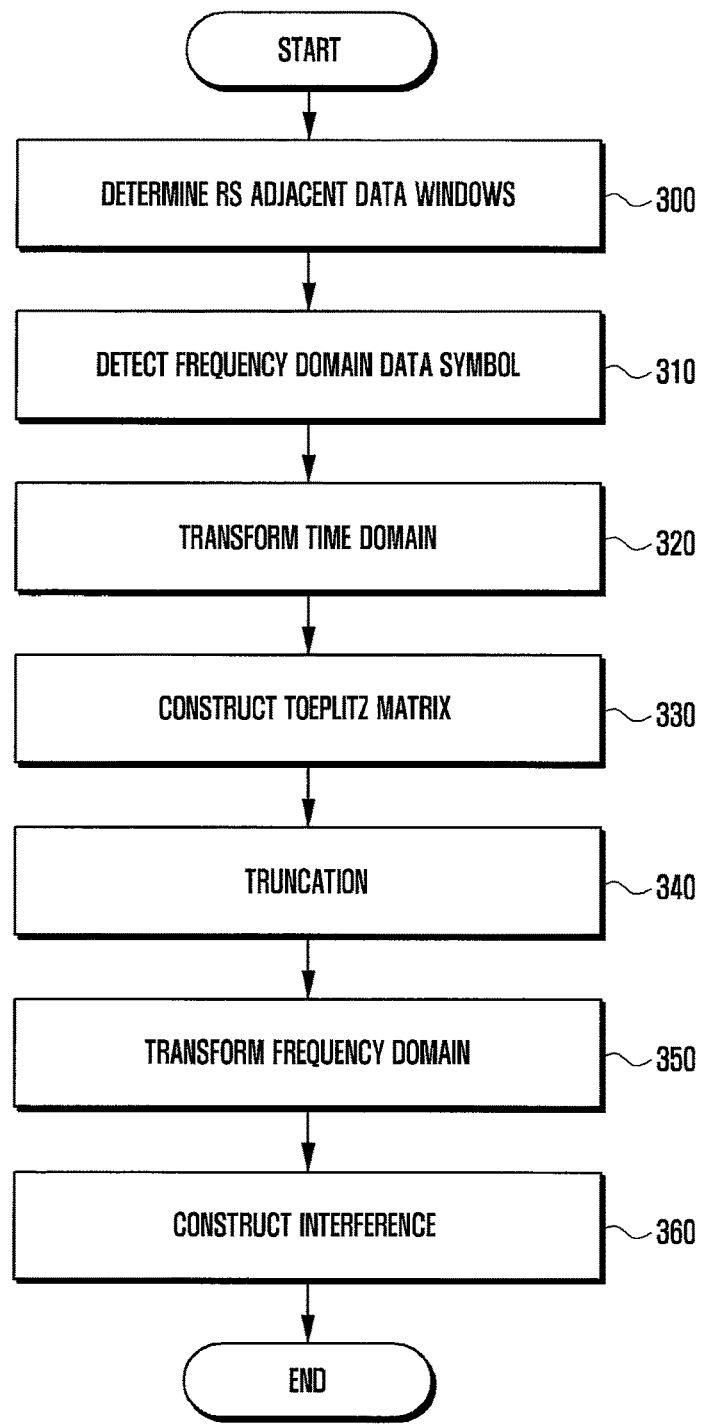
FIG. 3 is a flow chart of a method of constructing an interference component on the basis of a time domain transmit signal.

FIG. 3 is a flow chart of a method of constructing an interference component on the basis of a time domain transmit signal. Referring to FIG. 3, the receiver determines (300) the window of data adjacent to the reference signal. This is to determine to which extent of the data symbols adjacent to the reference signal needs to be considered to construct the interference component. If the window is large, the accuracy of the construction of the interference component is high but the complexity of the calculation is increased. To determine the window, an SNR and/or a signal to interference and noise ratio (SINR) that reflects a channel state, mobility of a terminal, and a modulation and coding scheme (MCS) can be considered. Further, a filter interference table shows an interference degree of the transmitting filter that is applied to the overlapping factor L of the overlap & sum structure of reflecting features of the FBMC system and symbols there around. Further, the window can be changed depending on where subcarriers are located on a resource block (RB) and a maximum delay spread or neighbor cells and a user's situation can be considered. The window can be determined in advance depending on the channel state or the features of the FBMC system or adaptively changed.

Next, the receiver detects (310) data symbols of the frequency domain depending on the determined window. The receiver performs an LM-point IFFT in consideration of a filter frequency response to convert (320) the detected data symbol into the time domain and constructs (330) the Toeplitz matrix using data symbols of the time base. In this process, the maximum channel length can be considered. Next, adjacent data symbols are truncated (340) using a truncation matrix that will be applied to the data symbols adjacent to the reference signal, the LM-point FFT is performed in consideration of the filter frequency response to again convert (350) the data symbols of the time domain into the frequency domain, and then the interference is constructed (360) using the converted transmit signal and the estimated channel impulse response.

In this case, the processes up to 350 of FIG. 3 are the same as the process of calculating Equation $P_R^H W_N T[k] W_N^H P_T X[k]$. The receiver detects (310) the data symbol $\underline{X}[k]$ of the frequency domain and multiples the detected $\underline{X}[k]$ by a $W_N^H P_T$ matrix to convert (320) the data symbols of the frequency domain into the time base. The detected frequency domain symbols are collected to construct the Toeplitz matrix and then are multiplied by the truncation matrix T[k] to truncate (350) the adjacent data symbols and are multiplied by a $P_R^H W_N$ matrix to convert the data symbols into the frequency domain. In this case, the truncation matrix can be determined in consideration of the overlap & sum structure of the FBMC system, that is, the symbol interval.

Figure 4:
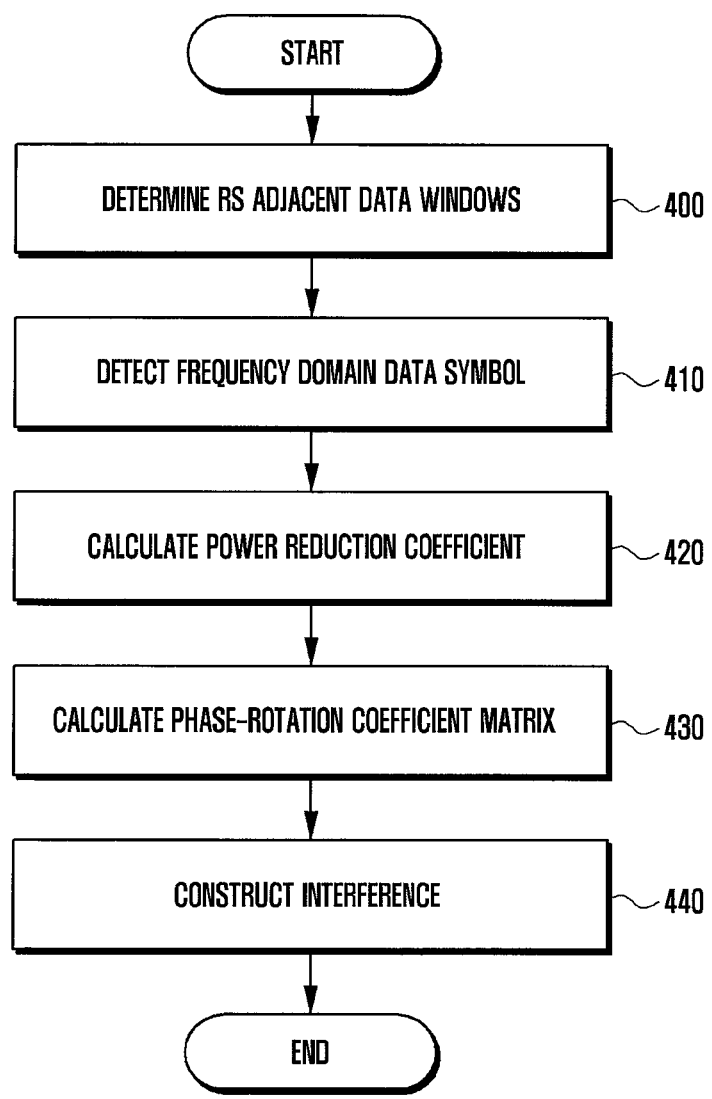
FIG. 4 is a flow chart of a method of constructing an interference component on the basis of a frequency domain transmit signal.

FIG. 4 is a flow chart of a method of constructing an interference component on the basis of a frequency domain transmit signal. The interference component constructed by the transmit signal detected by the method depends on the following Equation 9.

[Equation 9]

$$\Phi[k] \cong [\gamma_k \Theta_{k,0} X[k]\ \gamma_k \Theta_{k,1} X[k]\ \gamma_k \Theta_{k,2} X[k] \ldots] \quad (9)$$

In this case, $\gamma_k$ represents a power reduction coefficient and $\Theta_{k,n}$ represents a phase-shift coefficient matrix.

Referring to FIG. 4, the receiver determines (400) the window of data adjacent to the reference signal. In this process, matters considered to determine the window of data in FIG. 3 can be considered. Next, the receiver detects (410) data symbols of a frequency domain depending on the determined window. Next, the receiver calculates the power reduction coefficient $\gamma_k$. This can be considered in consideration of the filter time impulse response and the symbol interval and the overlapping factor L of the overlap & sum structure. Next, the receiver calculates the phase-shift coefficient matrix. The phase-shift coefficient matrix $\Theta_{k,n}$ can be determined depending on the filter time impulse response, the symbol interval and the overlapping factor L of the overlap & sum structure, and where the subcarriers are located on the resource block (RB). Further, the power reduction coefficient applied to the data symbols of each frequency domain can be the same value but the phase-shift coefficient matrix can be different every data symbol. The receiver constructs (440) the interference component using the calculated power reduction coefficient and phase-shift coefficient matrix and the converted transmit signal and estimated value of the channel impulse response.

The coefficient used for the interference construction can be changed when the used filter is changed, according to the position on the resource block of the symbol, or when the channel state is changed. The method of constructing an interference component using the time domain transmit signal of FIG. 3 can accurately construct the interference component, but has a disadvantage in that a computation of the receiver is increased and the method of constructing an interference component using the frequency domain transmit signal of FIG. 4 is a method of approximately constructing an interference component or has an advantage in that the computation of the receiver is reduced. A difference between the method of constructing an interference component based on a time domain transmit signal and the method of constructing an interference component based on a frequency domain transmit signal is a method for converting a transmit signal detected and the rest processes are substantially the same.

Next, a method of estimating a channel using a constructed interference component proposed in the present disclosure will be described. The channel estimator considered in the present disclosure can be represented by the following Equation 10.

[Equation 10]

$$J = W_N C_\alpha G^H (G C_\alpha G^H + (\sigma_I^2 + \sigma_n^2) P_R^H P_T)^{-1} \quad (10)$$

In the above Equation 10, $C_\alpha$ represents a channel covariance matrix, $\sigma_I^2$ represents an interference variance, and $\sigma_n^2$ represents noise variance. The receiver can estimate the channel impulse response based on the following Equation 11 by using the channel estimator of the above Equation 10.

[Equation 11]

$$\hat{h} = Jz \quad (11)$$
$$z = Y_{RS} \text{ or } Y_{RS} - \sum_{k=-L, k \neq 0}^{L-1} \Phi[k]h$$

Figure 5:
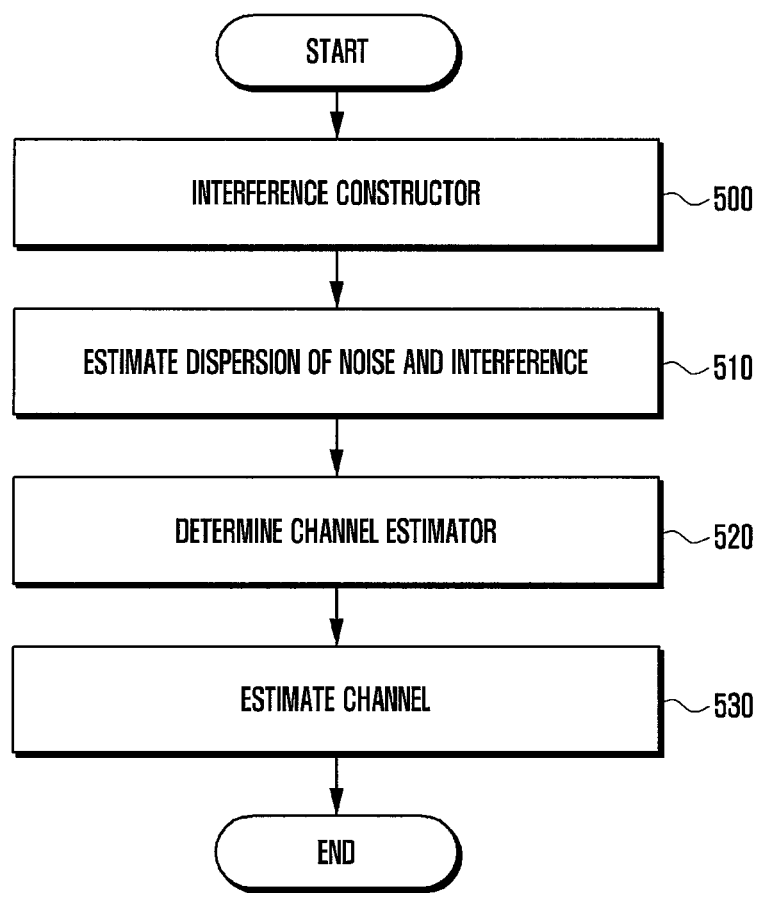
FIG. 5 is a flow chart of a method of estimating a channel using an interference component.

In this case, the z of the above Equation 11 and the G of the above Equation 10 are determined by the following FIG. 5.

FIG. 5 is a flow chart of a method of estimating a channel using an interference component. Referring to FIG. 5, the receiver estimates (510) the variance of noise and interference using an interference component (500) obtained by the interference constructor. In this case, the table that represents the SNR/SINR, the presence or absence of mobility of the terminal, and the interference degree on the time/frequency of the transmitting filter applied to the surrounding symbols, the inter-user interference information of adjacent cells or in a cell, or the like can be used to estimate the variance of noise and interference.

Next, the receiver determines (520) the channel estimator. In this case, a transmitting reference signal, an interference component construction scheme, the SNR/SINR, the presence and absence of mobility of the terminal, the MCS, the interference construction scheme, the filter frequency response information, or the like can be used to determine the channel estimator. Finally, the channel impulse response is estimated (530) using the received reference signal and the channel estimator.

The present disclosure proposes three method of estimating a channel using the constructed interference component. A first method is a method of updating a channel estimation value using reconstructed adjacent symbols, a second method is a method of updating a channel estimation value as a method of canceling a constructed interference component from a receiving symbol, and a third method is a method of calculating a channel estimation value using statistical characteristics of an interference component.

Figure 6:
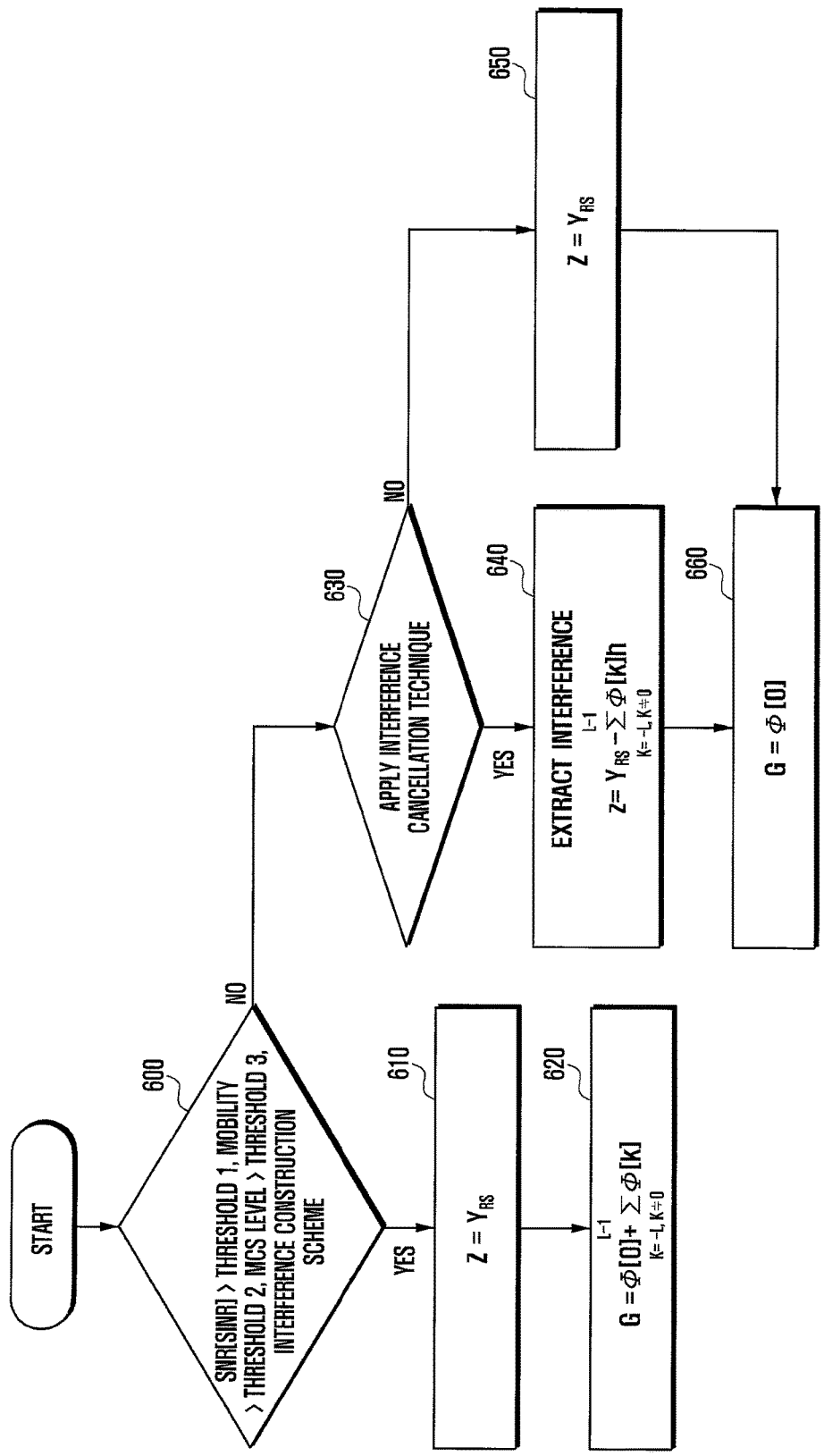
FIG. 6 is a flow chart of a method of determining which of three methods of estimating a channel is used, according to an embodiment of the present disclosure.

FIG. 6 is a flow chart of a method of determining which of three methods of estimating a channel is used, according to an embodiment of the present disclosure. Referring to FIG. 6, when in step 600, the SNR or the SINR of the receiver is higher than a first threshold value, the mobility of the receiver is higher than a second threshold value, and the MCS level applied to the receiver is higher than a third threshold value, the receiver determines (610) a z value as $Y_{RS}$. Otherwise, the receiver determines (630) whether to use a technique of canceling an interference component to estimate a channel. The first to third threshold values can be a preset value but can be variably determined in consideration of the transmitting filter and channel state, the overlap & sum structure, or the like. Further, in the step 600, the receiver can select step 610 or 620 depending on the interference construction scheme. When the receiver detects the data symbol, the accuracy of channel estimation required depending on the SNR, the SINR, and the MCS level can be different. For example, when the MCS level of the transmit signal is high, very accurate channel estimation is required. The accurate channel estimation may not be required under the situation that the SNR or the SINR is low. Therefore, since the complexity and the channel estimation accuracy among the three methods of estimating a channel proposed in the present disclosure are different, the method of estimating a channel suitable for the accuracy of channel estimation required depending on the SNR, the SINR, and the MCS level needs to be selected.

In the step 610, after the z value is determined as $Y_{RS}$, the receiver determines (620) the G value of the above Equation 4 as $$G = \Phi[0] + \sum_{k=-L, k \neq 0}^{L-1} \Phi[k].$$

In the step 630, the receiver determines (640) the z value as $$z = Y_{RS} - \sum_{k=-L, k \neq 0}^{L-1} \Phi[k]h$$

when the technique of canceling an interference component is applied. This is to cancel the constructed interference component from the z value. Next, the receiver determines (660) the G value as $G=\Phi[0]$. When the technique of canceling an interference component is not applied in the step 630, the receiver determines (650) the z value as $Y_{RS}$ and determines (660) the G value as $G=\Phi[0]$. The method of estimating a channel of the step 620 is the first method, the method of estimating a channel to which the technique of canceling an interference component in the step 630 is applied is the second method, and the method of estimating a channel to which the technique of canceling an interference component in the step 630 is applied is the third method.

The receiver uses the z and G values determined with reference to FIG. 6 to generate the channel estimator depending on the above Equation 4 and estimates the channel frequency response depending on the above Equation 5. The receiver can again update the channel estimator or update the reconstructed interference, on the basis of the estimated channel frequency response.

Figure 7:
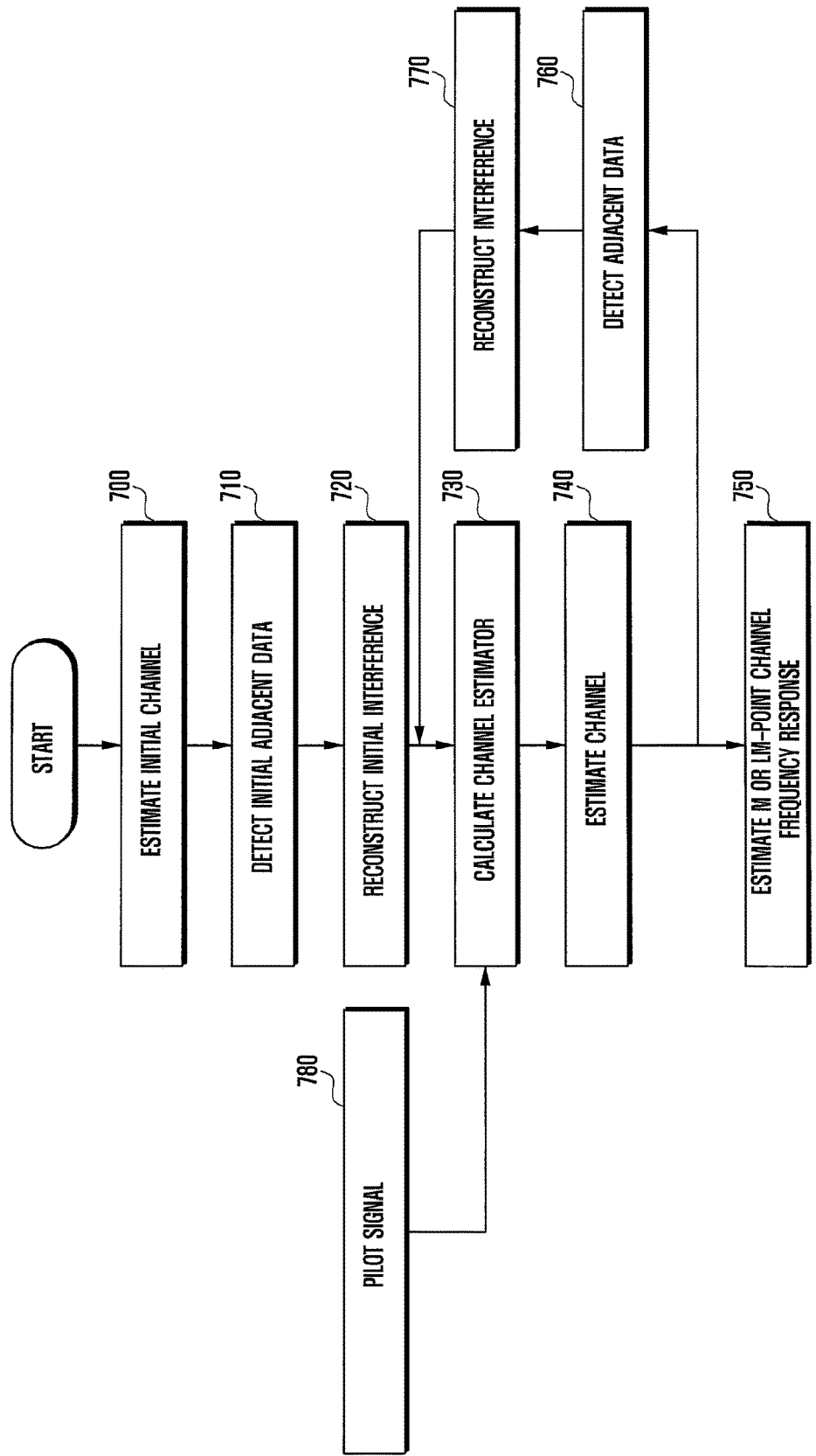
FIG. 7 is a diagram illustrating a method of estimating a channel on the basis of a first method of estimating a channel according to an embodiment of the present disclosure.

FIG. 7 is a diagram illustrating a method of estimating a channel on the basis of a first method of estimating a channel according to an embodiment of the present disclosure. Referring to FIG. 7, the receiver estimates (700) an initial channel and detects (710) initial adjacent data. The receiver reconstructs (720) initial interference on the basis of the initial channel and the initial adjacent data and calculates (730) the channel estimator of the above Equation 4 using the constructed initial interference and a pilot signal (780). The receiver estimates (740) the channel with reference to the above Equation 5 on the basis of the channel estimator calculated in the step 730 and detects (760) adjacent data on the basis of the estimated channel again. The receiver reconstructs (770) interference on the basis of the re-detected adjacent data and again calculates (730) the channel estimator using the reconstructed interference component. The receiver estimates (740) the channel using the channel estimator again calculated and updates the channel estimator for the set iterative frequency and then finally estimates (750) the M or LM point channel frequency response.

The iterative frequency of updating the channel estimator can be preset depending on the SNR, or the SINR, the MCS, the channel state, or the FBMC system. Alternatively, when during the process of updating the channel estimator, the iterative frequency is determined based on the comparison result obtained by comparing the received reference signal canceling the constructed interference component and the reference signal with the noise variance or the difference between the channel values which are iteratively estimated is smaller than a specific threshold value, the iteration may also stop. The iterative frequency can be applied even to an iteration of another method of estimating a channel.

In this case, the z value becomes $Y_{RS}$ and the G value becomes $$G = \Phi[0] + \sum_{k=-L, k \neq 0}^{L-1} \Phi[k].$$

Figure 8:
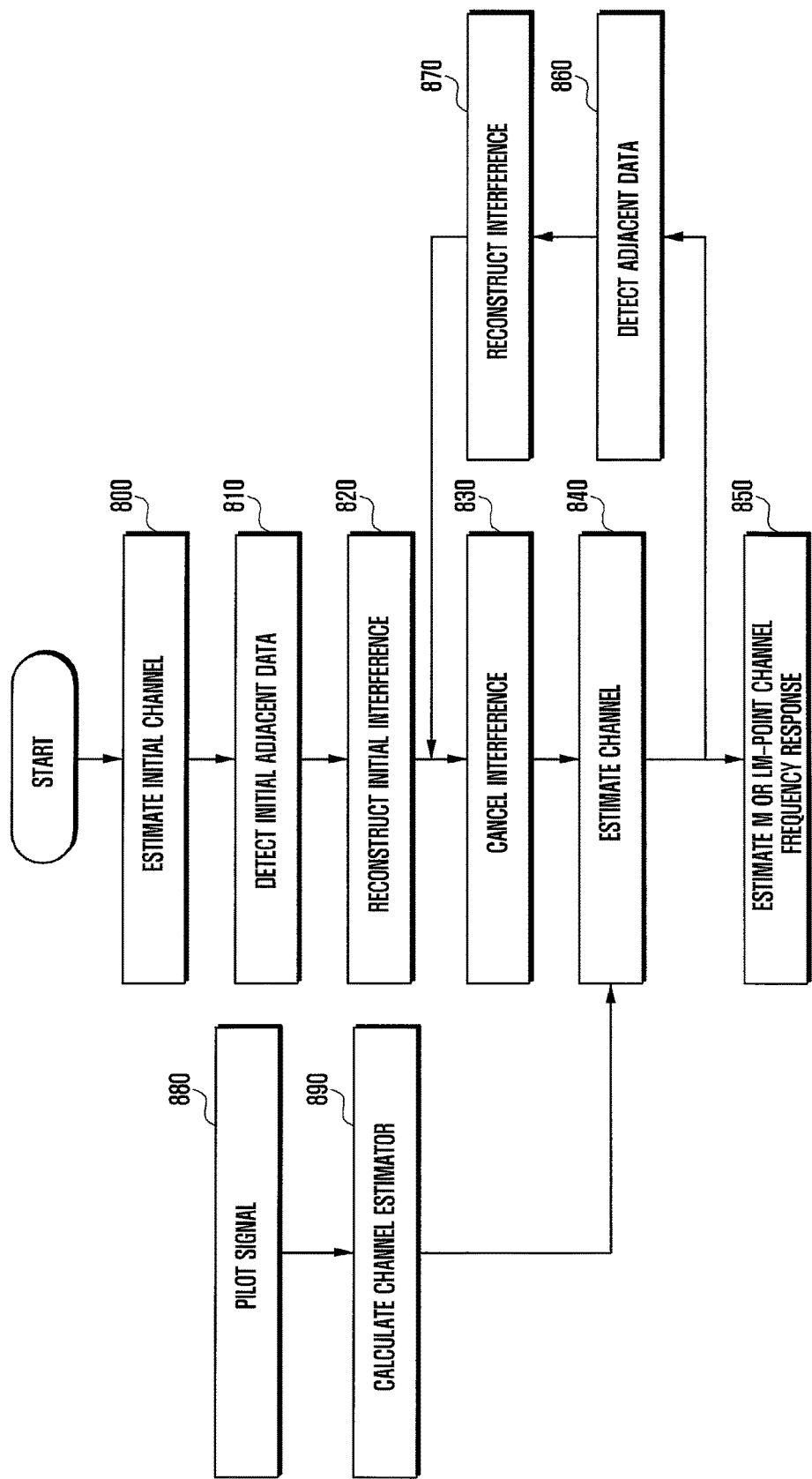
FIG. 8 is a diagram illustrating a method of updating a channel response and an interference construction matrix in a second method of estimating a channel according to an embodiment of the present disclosure.

FIG. 8 is a diagram illustrating a method of updating a channel response and an interference construction matrix in a second method of estimating a channel according to an embodiment of the present disclosure. Referring to FIG. 8, the receiver estimates (800) the initial channel and detects (810) the initial adjacent data. The receiver reconstructs (820) the initial interference on the basis of the initial channel and the initial adjacent data and cancels (830) the interference using the method of canceling the constructed initial interference from the received pilot signal. The receiver estimates (840) the channel using a channel estimator (890) calculated on the basis of the receive signal and a pilot signal (880) from which the interference is canceled and again detects (860) the adjacent data on the basis of the estimated channel. The receiver reconstructs (870) the interference on the basis of the re-detected adjacent data and again cancels (830) the constructed interference from the received pilot signal on the basis of the reconstructed interference component. The receiver again estimates (840) the channel with reference to the above Equations 4 and 5 on the basis of the receive signal and the pilot signal from which the reconstructed interference is removed. The receiver updates the channel estimation and the interference construction matrix for the set iterative frequency and then finally estimates (850) the M or LM point channel frequency response.

In this case, the z value becomes $$z = Y_{RS} - \sum_{k=-L, k \neq 0}^{L-1} \Phi[k]h$$

and the G value becomes $G=\Phi[0]$.

Figure 9:
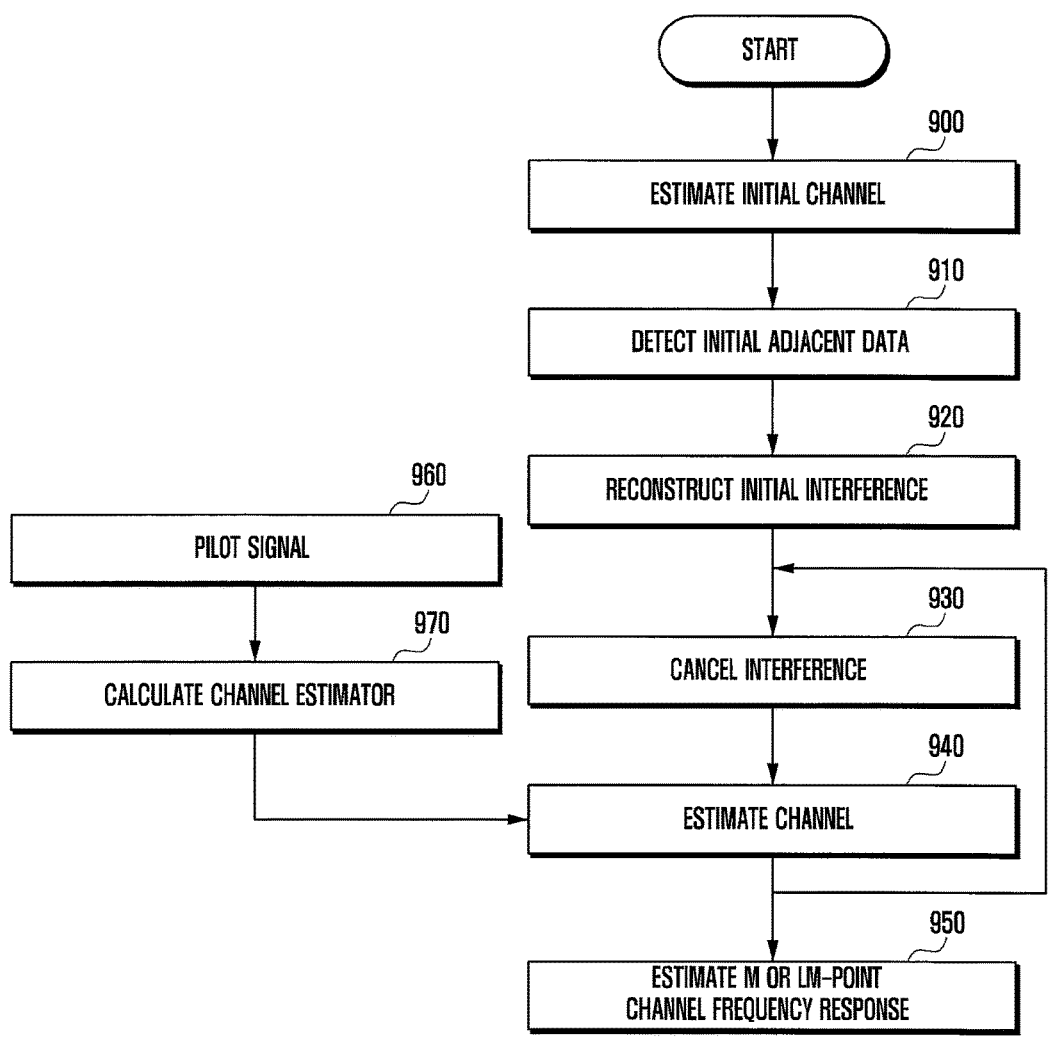
FIG. 9 is a diagram illustrating a method of updating only a channel response in the second method of estimating a channel according to the embodiment of the present disclosure.

FIG. 9 is a diagram illustrating a method of updating only a channel response in the second method of estimating a channel according to the embodiment of the present disclosure. Referring to FIG. 9, the receiver estimates (900) the initial channel and detects (910) the initial adjacent data. The receiver reconstructs (920) the initial interference on the basis of the initial channel and the initial adjacent data and cancels (930) the interference using the method of canceling the constructed initial interference from the received pilot signal. The receiver estimates (940) the channel using a channel estimator (970) calculated on the basis of a receive signal and a pilot signal (960) from which the interference is canceled and reconstructs the interference on the basis of the estimated channel and the initial adjacent data and cancels (930) the reconstructed interference from the received reference signal. The receiver again estimates (940) the channel with reference to the above Equations 4 and 5 on the basis of the receive signal and the pilot signal from which the reconstructed interference is removed. The receiver updates the channel estimation and the interference construction matrix for the set iterative frequency and then finally estimates (950) the M or LM point channel frequency response.

In this case, the z value becomes $$z = Y_{RS} - \sum_{k=-L, k \neq 0}^{L-1} \Phi[k]h$$

and the G value becomes G=Φ[0].

The third method of estimating a channel according to the present disclosure is a method of calculating a channel estimation value using statistical characteristics of an interference component and is a method of calculating a channel estimator using an interference variance value of the above Equation 4 from the interference Table of the transmitting filter.

In this case, the z value becomes $Y_{RS}$ and the G value becomes G=Φ[0].

FIG. 10 is a diagram illustrating the effect of the present disclosure. Referring to FIG. 10, as a result of illustrating, based on the SNR, a mean square error (MSE) of the channel estimation according to the existing method of estimating a channel and the method of estimating a channel proposed by the present disclosure, it can be confirmed that the method of estimating a channel proposed by the present disclosure has the reduced MSE compared to the existing method of estimating a channel. Further, as a result of illustrating, based on the SNR, a bit error rate (BER) according to the case of completely estimating a channel, the existing method of estimating a channel, and the method of estimating a channel proposed by the present disclosure, it can be confirmed that the method of estimating a channel proposed by the present disclosure has an improved effect of the SNR as much as about 10 dB compared to the existing method of estimating a channel.

Figure 11:
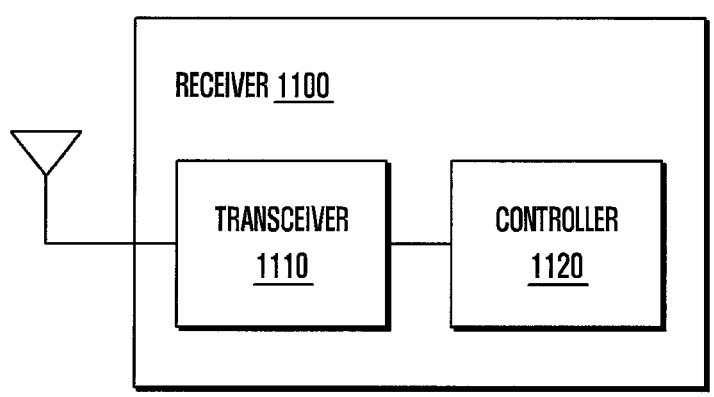
FIG. 11 is a diagram illustrating another receiver capable of performing the method of the present disclosure.

FIG. 11 is a diagram illustrating another receiver capable of performing the method of the present disclosure. A receiver 1100 is configured to include a transceiver 1110 and a controller 1120, in which the transceiver 1110 receives the reference signal and data that a transmitter (not illustrated) transmits. The controller 1120 performs the method of the present disclosure illustrated in FIGS. 3 to 9. More particularly, the controller 1120 determines the window for the reference signal adjacent data, estimate the initial data symbol and the initial channel, construct the interference, determine the channel estimator, estimate the channel, and estimate the channel impulse response. Further, an operation for the process can be performed.

According to the embodiment of the present disclosure, it is possible to greatly improve the channel estimation performance of the receiver by constructing the adjacent transmit signals of the received reference signal and the interference signal as the channel impulse response and positively using the constructed interference signal for the channel estimation. In particular, the present disclosure has the advantage of more accurately estimating the channel response than the existing technique even when the number of reference signals used for the channel estimation is small. The constructed interference signal can be reused for the equalization or the data detection as well as the channel estimation. The present disclosure can estimate the time impulse response of the channel to obtain the channel frequency response corresponding to the sub carrier on the frequency domain and the over-sampled channel frequency response. The over-sampled channel frequency response is necessarily required in the equalization process for improvement in the receiver performance in the non-orthogonal system. The present disclosure can be applied to the general non-orthogonal system adopting the overlap & sum transmitting structure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a receiver for channel estimation by constructing an interference signal, the method comprising:
   receiving a reference signal and data;
   estimating an initial channel state based on the received reference signal;
   detecting adjacent data symbols located in a window that is a range around the reference signal based on the initial channel state;
   constructing the interference signal due to the adjacent data symbols based on the detected adjacent data symbols and the initial channel state;
   estimating a channel state based on the constructed interference signal; and
   performing an iterative process of reconstructing the interference signal based on the estimated channel state and re-detected adjacent data symbols based on the channel state; and
   re-estimating the channel state based on the reconstructed interference signal,
   wherein the window indicates a number of data symbols around the reference signal which construct an interference to the reference signal.

2. The method of claim 1, further comprising determining a window.

3. The method of claim 1, further comprising calculating a channel estimator J based on the interference signal.

4. The method of claim 3, wherein the re-detected adjacent data symbols are identified based on the channel state estimated using the channel estimator J.

5. The method of claim 4, wherein the channel estimator J is given by $J = W_N C_\alpha G^H (G C_\alpha G^H + (\sigma_I^2 + \sigma_N^2) P_R^H P_T)^{-1}$, where $C_\alpha$ represents a channel covariance matrix, $\sigma_I^2$ represents an interference variance, and $\sigma_n^2$ represents noise variance.

6. The method of claim 5, wherein the channel state is determined by a channel impulse response h, and wherein the channel impulse response h is calculated by $\hat{h} = Jz$, where z is $Y_{RS}$, and G is $$G = \Phi[0] + \sum_{k=-L, k \neq 0}^{L-1} \Phi[k].$$

7. The method of claim 1, further comprising canceling the interference signal from a received reference signal based on the interference signal.

8. The method of claim 7, wherein the re-detected adjacent data symbols are identified based on the channel state estimated based on the received reference signal from which the interference signal is canceled.

9. The method of claim 8, wherein the channel state is determined by a channel impulse response h, and wherein the channel impulse response h is calculated by $\hat{h}$=Jz, a channel estimator J is given by $J=W_N C_\alpha G^H(GC_\alpha G^H+(\sigma_I^2+\sigma_N^2)P_R^H P_T)^{-1}$ $$z = Y_{RS} - \sum_{k=-L, k\neq 0}^{L-1} \Phi[k]h,$$

where G is G=Φ[0], $C_\alpha$ represents a channel covariance matrix, $\sigma_I^2$ represents an interference variance, and $\sigma_n^2$ represents noise variance.

10. The method of claim 1, wherein the channel state is determined by a channel impulse response h, and wherein the channel impulse response h is calculated by $\hat{h}$=Jz, a channel estimator J is given by $J=W_N C_\alpha G^H(GC_\alpha G^H+(\sigma_I^2+\sigma_N^2)P_R^H P_T)^{-1}$, where z is $Y_{RS}$, G is G=Φ[0], $C_\alpha$ represents a channel covariance matrix, $\sigma_I^2$ represents an interference variance, $\sigma_n^2$ represents noise variance, and the noise variance is estimated in the initial channel state.

11. A receiver for channel estimation by constructing an interference signal, the receiver comprising:
a transceiver configured to receive a reference signal and data transmitted from a transmitter; and
a controller operably connected to the transceiver, the controller configured to:
estimate an initial channel state based on the received reference signal,
detect adjacent data symbols located in a window which is a range around the reference signal based on the initial channel state,
construct the interference signal due to the adjacent data symbols based on the detected adjacent data symbols and the initial channel state,
estimate a channel state based on the constructed interference signal,
perform an iterative process of reconstructing the interference signal based on the estimated channel state and re-detected adjacent data symbols based on the channel state, and
re-estimate the channel state based on the reconstructed interference signal,
wherein the window indicates a number of data symbols around the reference signal that constructs an interference to the reference signal.

12. The receiver of claim 11, wherein the controller is further configured to determine a window.

13. The receiver of claim 11, wherein the controller is further configured to calculate a channel estimator J based on the interference signal.

14. The receiver of claim 13, wherein the re-detected adjacent data symbols are identified based on the channel state estimated using the channel estimator J.

15. The receiver of claim 14, wherein the channel estimator J is given by $J=W_N C_\alpha G^H(GC_\alpha G^H+(\sigma_I^2+\sigma_N^2)P_R^H P_T)^{-1}$, where $C_\alpha$ represents a channel covariance matrix, $\sigma_I^2$ represents an interference variance and $\sigma_n^2$ represents noise variance.

16. The receiver of claim 15, wherein the channel state is determined by a channel impulse response h, and wherein the channel impulse response h is calculated by $\hat{h}$=Jz, where z is $Y_{RS}$, and G is $$G = \Phi[0] + \sum_{k=-L, k\neq 0}^{L-1} \Phi[k].$$

17. The receiver of claim 11, wherein the controller is further configured to cancel the interference signal from a received reference signal based on the interference signal.

18. The receiver of claim 17, wherein the re-detected adjacent data symbols are identified based on the channel state estimated based on the received reference signal from which the interference signal is canceled.

19. The receiver of claim 18, wherein the channel state is determined by a channel impulse response h, and wherein the channel impulse response h calculated by $\hat{h}$=Jz, a channel estimator J is given by $J=W_N C_\alpha G^H(GC_\alpha G^H+(\sigma_I^2+\sigma_N^2)P_R^H P_T)^{-1}$, $$z = Y_{RS} - \sum_{k=-L, k\neq 0}^{L-1} \Phi[k]h,$$

where G is G =Φ[0], $C_\alpha$ represents a channel covariance matrix, $\sigma_I^2$ represents an interference variance, and $\sigma_n^2$ represents noise variance.

20. The receiver of claim 11, wherein the channel state is determined by a channel impulse response h, and wherein the channel impulse response h is calculated by $z,\therefore =Jz$, a channel estimator J is given by $J=W_N C_\alpha G^H(GC_\alpha G^H+(\sigma_I^2+\sigma_N^2)P_R^H P_T)^{-1}$, where z is $Y_{RS}$, G is G=Φ[0], $C_\alpha$ represents a channel covariance matrix, $\sigma_I^2$ represents an interference variance, $\sigma_n^2$ represents noise variance, and the noise variance is estimated in the initial channel state.

* * * * *